United States Patent [19]

Witherspoon

[11] 4,294,899
[45] Oct. 13, 1981

[54] PTFE-BOUND TALC SEPARATORS FOR SECONDARY ZINC ALKALINE BATTERIES

[75] Inventor: Romeo R. Witherspoon, Utica, Mich.

[73] Assignee: General Motors Corporation, Detroit, Mich.

[21] Appl. No.: 145,595

[22] Filed: May 1, 1980

[51] Int. Cl.³ ............................................. H01M 2/16
[52] U.S. Cl. ................................... 429/206; 429/229; 429/252
[58] Field of Search ............................... 429/247–252, 429/254, 229, 206, 129; 106/58

[56] References Cited

U.S. PATENT DOCUMENTS

| | | | |
|---|---|---|---|
| 3,364,077 | 1/1968 | Arrance et al. | 429/251 X |
| 3,379,570 | 4/1968 | Berger et al. | 429/129 |
| 3,713,890 | 1/1973 | Strier et al. | 429/252 |
| 3,736,185 | 5/1973 | Smatko | 429/252 |
| 4,052,540 | 10/1977 | Smatko | 429/229 |

Primary Examiner—Anthony Skapars
Attorney, Agent, or Firm—Lawrence B. Plant

[57] ABSTRACT

An interelectrode separator for a secondary zinc alkaline battery comprising talc platelets in a fibrillated polytetrafluoroethylene binder with or without calcium acetate, calcium formate or zirconyl acetate and a method of making same. As little as 45% by weight talc may be used in separators containing calcium or zirconium salts.

5 Claims, 3 Drawing Figures

PTFE-BOUND TALC SEPARATORS FOR SECONDARY ZINC ALKALINE BATTERIES

BACKGROUND OF THE INVENTION

The subject invention relates to interelectrode separators for eliminating zinc dendrite bridging between opposite polarity electrodes in secondary alkaline zinc batteries.

Battery separators function essentially to electrically isolate the positive and negative plates from each other. They prevent direct contact and suppress "treeing" or interelectrode dendrite growth which causes shorting of the respective plates. An ideal separator would isolate the plates without inhibiting electrolyte mobility, and without increasing the battery's internal resistance.

For many years, regenerated cellulose was the most commonly used separator for secondary zinc alkaline batteries (e.g., silver-zinc, nickel-zinc). In this regard, fibrous sausage casing and unplasticized cellophane (i.e., 0.025–0.5 mm dry thickness) were wrapped at least one time around the zinc electrode. Often several turns of the separator were used to insure adequate dendrite resistance. These cellulosic separator materials were generally utilized in conjunction with an "interseparator" which was a loosely woven or bibulous material wrapped or heat-sealed around the positive electrode to prevent the cellulosic separator from contacting the highly oxidizing environment of the positive electrode. Cellulosics performed well in vented, flooded cells but lacked long-term stability in sealed cells and at temperatures above the ambient (i.e., up to 100° C.). Other problems with cellulosic separators involved swelling and degredation due to oxidation.

More recently, newer types of separators with better chemical stability and physical properties have become available. One such class of separators has been designated I/O inorganic/organic) separators and comprises a major inorganic component in a highly stable organic polymer binder. Such separators typically include various inorganic oxides, hydroxides, etc. in a fibrillated polytetrafluoroethylene (hereafter PTFE) binder. These materials are highly flexible and quite durable in the alkaline electrolyte of a secondary zinc battery. The process for making such materials essentially consists of the mixing of the PTFE and inorganic materials under mild shear conditions (e.g., liquid blender) with a high-boiling naphtha lubricant at temperatures above 19° C. to cause fibrillation of the PTFE (see HS-10 bulletin by E. I. Du Pont de Nemours & Co., Plastics Dept., 1968). PTFE levels are normally in the 1–25% by weight range.

It is an object of the present invention to provide a new, low cost separator which is strong, flexible and particularly useful in preventing zinc dendrite growth between the electrodes of a secondary alkaline zinc battery. This and other objects and advantages of the present invention will become more readily apparent and understood from the following detailed description and illustration thereof.

BRIEF DESCRIPTION OF THE INVENTION

Figure 1:
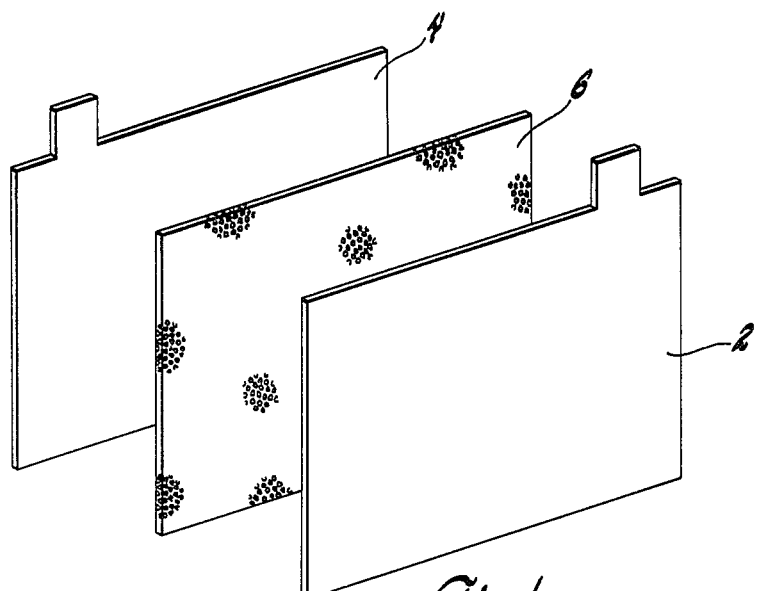
FIG. 1 is an exploded perspective view of a separator sandwiched between two battery electrodes.

The present invention contemplates paralleloriented, overlapping lamellar talc (i.e., hydrous magnesium silicate) platelets in a fibrillated PTFE binder formed under high shear conditions (e.g., heavy duty mixing and rolling) with selected lubricants (e.g., glycols) which serve as a fiberizing agent for the PTFE. The lubricant is later removed leaving a porous sheet having a density of about 1.75 g/cm$^3$ to about 2.1 g/cm$^3$. The platelets in one layer overlap the edges of platelets in adjacent layers so as to insure that there are no continuous pores extending directly through the separator. The talc may be used alone or admixed with calcium carboxylates (i.e., acetate or formate) to trap zincate ions or zirconyl acetate to further retard zinc dendrite penetration. The PTFE-talc-lubricant mix, with or without additives, is kneaded from a wet slurry state through a doughy state and finally to a shreddy state. Thereafter, the mix is pressed, dried and calendered to reduce its thickness, to orient the talc platelets substantially parallel to each other and to the faces of the sheet, and to develop the strength of the PTFE fibers. Finally, the sheet is heated to drive off the lubricant, followed by cutting the sheet into individual separators.

Talc suitable for use in the present invention is: a hydrous magnesium silicate with the generally-accepted formula $Mg_3Si_4O_{10}(OH)_2$; classed as a sheet silicate of the monoclinic crystal system; and in the form of tiny platelets. The x-ray density of the talc is listed as 2.784 g/cm$^3$. Naturally occurring talc varies widely in composition and physical form depending on where it is mined. The mineral impurities can also vary widely. The iron and heavy metals content should be sufficiently low, or chemically combined, so that they will not be leached out of the talc by the electrolyte. The iron content, for example, should preferably be below about 0.40% by weight of the talc. The talc is of the so-called "platy" variety (i.e., thin, flat platelets) having a mean diameter in about the 3–10 um (micrometer) range and thicknesses in the fractional micrometer range. If the platelets are too large, the electrical resistance of the separators will be excessive. If, on the other hand, the platelets are too small, they begin to behave more like particles than overlapping platelets and dendrite penetration can take place. Talcs which contain large amounts of carbonates and asbestos-type minerals are not considered as suitable as the purer varieties. In general, natural talcs from Montana and selected eastern areas of the U.S.A., as well as in some other parts of the world, have an acceptable natural "platy" structure useful with the present invention.

Generally, separators which do not contain calcium or zirconium salts comprise at least about 75% (preferably about 80–85%) by weight talc and the balance PTFE. When calcium acetate or calcium formate is added to trap the zincate ions as calcium zincate, the separator will contain about 15–20% PTFE, about 10–35% calcium salt and the balance talc. Zirconyl acetate, on the other hand, reduces the pore size significantly. Such separators will contain about 13–20% PTFE, about 5–20% zirconyl acetate and the balance talc. Zirconyl acetate concentrations above about 10% by weight are less flexible than those below about 10% and are more difficult to heat/pressure seal along the edges. In this latter regard, it is often desirable that the negative electrode be enveloped in a separator folded at the bottom and heat/pressure sealed along the sides and often the top.

The completed separators are porous and preferably in the density range of about 1.75–2.1 g/cm$^3$. The interconnected spaces between, and defined by, the talc platelets provide the separator's network of pores. Separators with densities below about 1.75 g/cm$^3$ are more susceptible to dendrite penetration, while separators with densities above about 2.1 g/cm$^3$ tend to have too much resistivity for practical battery use.

Separators according to the present invention are made by mixing the talc and a PTFE-fibrillating lubricant (e.g., higher straight chain alcohols, selected glycols or glycol ethers) together in a slow-moving, heavy-duty mixer with double planetary action paddles. The lubricant will comprise about 5–20% of the final PTFE-lubricant-talc mixture. If the calcium or zirconium salts are to be used, they may be added to the mixture at this time and the entire mass blended to a uniform consistency. A PTFE emulsion (i.e., PTFE suspended in H$_2$O) is then added to the mix in the mixer and mixing continued until the consistency of the mass transforms from a damp or wet slurry into a thick putty-like mass (sometimes defined as a viscoelastic dough) and finally converts into a mass of small shreds. This sheddy mass is then flattened (e.g., to about 2 mm to 4 mm thick) by pressing between two smooth plastic plates and air-dried to remove any water. This material, which now contains essentially only talc, lubricant and PTFE, is then passed through a calendering mill several times in cross-rolling fashion (i.e., each roll is 90° from the previous roll direction) and with successive reductions in thickness to orient the platelets parallel to each other and the faces of the sheet and to bring the sheet to its final thickness which will generally be in the 0.1–0.2 mm range. The mixing and rolling times are designed to develop the strength of the PTFE fibers to their maximum, without exceeding their maximum strength point. Actual times vary with composition of the mix, and the composition and amount of lubricant used. The best time for any given mix may be estimated by testing a batch thereof at various time intervals using conventional tensile strength methods. Following rolling, the sheets are heated to remove the lubricant from the separators and thereby provide the network of pores between the platelets. This is conveniently carried out by heating the sheet for about one hour in a circulating air oven at a temperature of 150°–175° C. Temperatures much higher than this are not recommended due to the possibility of decomposing the metal salts, if present.

The density, and hence porosity, of the final separator after the lubricant removal step is directly related to the amount of lubricant used and subsequently removed. Excessive lubricant results in lower densities and larger pores while very small amounts of lubricant give higher densities and smaller pores, but may also cause sticking to the calendering mill. The preferred density is about 1.95–2.1 g/cm$^3$. Separators according to the present invention have been made within the preferred density range as thin as 0.025–0.05 mm without developing any "pinholes" therein.

A number of organic compounds will perform effectively as a lubricant and fiberizing agent for PTFE. Some of the more suitable ones are the aliphatic alcohols having from 4–20 carbon atoms in either a straight chain or branched structure. Preferred lubricants will have boiling points in the range of 80°–250° C., viscosities in the 20–80 cP range and should be miscible with both water and ether. The diglycol eithers (e.g., diethylene glycol and dipropylene glycol) are preferred with dipropylene glycol being most preferred.

Talc-PTFE separators in accordance with the present invention may also be fabricated by mixing the talc with dry PTFE powder (for example, Du Pont T-6) and the lubricant. This mixture is then milled on a rolling mill with the rolls set for shear conditions and rolled until the fabrillar form of the PTFE is developed. Thereafter, the mill is reset to a calendering mode and sheets rolled and cross-rolled to the desired thickness. Thereafter, the lubricant is removed as before. It should be noted that separators having calcium and zirconium salts therein are preferably made with PTFE emulsions (rather than dry PTFE) so as to insure that the salt dissolves during processing so as to avoid the presence of undissolved salt crystals which can cause flaws and pinholes in the separators.

Separators in accordance with the present invention may also be made by a papermaking process (i.e., four-drinear) wherein the talc, metal salt, and PTFE are combined in an organic suspension medium such as isopropanol with a small amount of lubricant. Sheets are vacuumformed and pressed, followed by passing the sheets through the rolling mill to develop the PTFE fibers as described above. This technique, however, requires considerable care to insure homogeneous distribution of the talc, salt and PTFE.

Figure 2:
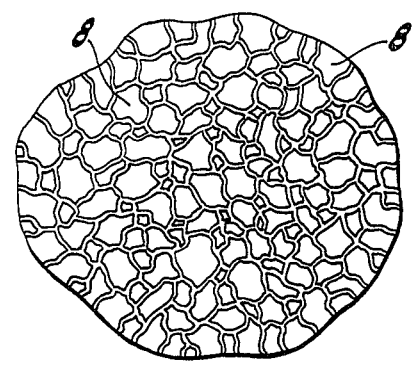
FIG. 2 illustrates a magnified plan view of a region of a separator according to the present invention.
Figure 3:
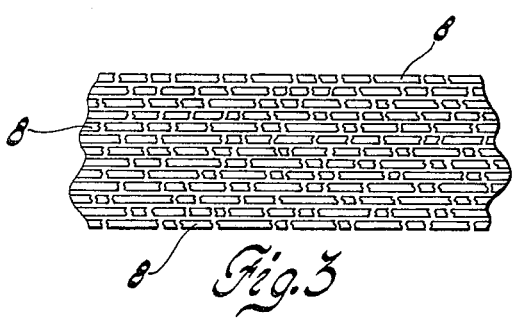
FIG. 3 illustrates a magnified side elevational view of a region of a separator according to the present invention.

FIG. 1 illustrates a zinc electrode 2 separated from a positive counterelectrode 4 (e.g., NiOOH) by a microporous separator 6 in accordance with the present invention. It is to be appreciated that many such electrode-separator sets are combined in a single cell for increased capacity. FIGS. 2 and 3 are a draftsman's illustration of a magnified portion of the separator 6 and depict the multiplicity and overlapping of the talc platelets 8.

EXAMPLE I

Separators in accordance with the present invention were made from the following ingredients and in the manner described hereafter:

Talc (J. T. Baker Chemical Co. #4101)—800 g
Dipropylene glycol (Eastman Kodak)—150 ml
PTFE, T-30B emulsion (0.90 g solids/ml) (E. I. Du Pont de Nemours & Co., Inc.)—200 ml The talc and dipropylene glycol were mixed for 5 minutes in a Ross Model 130 ELS double planetary mixer. Thereafter, the PTFE emulsion was slowly added to the mixture in the mixer over a period of one minute and mixing continued. The consistency of the mixture changed from a slurry to a thick viscoelastic dough after about one additional minute. Mixing was continued for another six minutes until the doughy mix converted into a mass comprising numerous small "shreds". The resulting material was divided into four equal parts and pressed three times at 50 tons between plastic plates to form four disc-shaped pieces approximately 30 cm in diameter and 2.5 mm thick. The sheets were then dried for 60 minutes at 80° C. to where the weight loss was equivalent to the loss of all the water in the mix. The dried sheets were then cut into halves and passed through a calendering mill for four successive passes with a 90° rotation of the sheet between each press. The resulting sheets were 0.02 cm thick and yielded 48 separators with an area of 20 cm×20 cm. The separators were then heated at 150° C. for one hour to remove the glycol. The separators were soft and pliable, had excellent strength and flexibility and could be folded over their own thickness without cracking. The density of the separators was 1.95 g/cm$^3$ and the resistivity in 33% KOH (by weight) electrolyte was 100 OHM·cm. Edge seals could be effected by cold pressure bonding (i.e., 4–6 tons/in$^2$), or by means of heat or ultrasonics. Samples of this material were heat-sealed around zinc electrodes (76 cm$^2$) and tested against nonsintered nickel oxide positive electrodes in sealed cells using 33% KOH electrolyte. The zinc/nickel oxide ratio was 3.3:1 and the cell capacity was 1.0 A·h. The cells were cycled according to a regime involving 4 hours charge (with 10% overcharge) and 2 hours discharge to 1.0 V. Capacity of the cell slowly declined with cycling at the 100% depth of discharge condition. At 200 cycles capacity had dropped below 75% of the cell's original capacity. At 390 cycles capacity had dropped to 60% of original capacity. On disassembly no evidence of zinc penetration of the separator was found. Rather, the mode of failure was found to be extensive redistribution of the zinc electrode (i.e., shape change).

EXAMPLE II

Separators in accordance with the present invention were made from the following ingredients and in the manner described hereafter:
Talc (J. T. Baker #4101)—400 g
Calcium acetate CaAc. (X H$_2$O)—400 g
Dipropylene glycol/dodecyl alcohol (1/1)—120 g
PTFE, T-30B emulsion—200 ml The talc and calcium acetate (anhydrous preferably) were mixed for 5 minutes in the same Ross mixer as mentioned in Example I and thereafter the mixed alcohols slowly added with continuous mixing for an additional 5 minutes. The PTFE emulsion was then added in the same manner as the mixed alcohols and mixing continued for another 6 minutes until the mix consistency was as described in Example I. Sheets were formed by pressing as described in Example I, dried to a water-free condition and rolled with 4 passes through a calendering mill to sheets 20 cm×20 cm×0.02 cm thick. The sheets had a density of 2.00 g/cm$^3$ and a resistivity of 60 OHM·cm. These separators were sealed around zinc electrodes (as above) and cycled in a variety of Zn/Ni-OOH cells ranging from 1 A·h–20 A·h. Cycling lasted for 170–200 cycles before any evidence of dendrite shorting was indicated. Examination of the specimens after cycling showed some dendrite penetration at the outer edges of the seal area only.

EXAMPLE III

Separators containing zirconyl acetate were made in the same manner as described for the calcium acetate separators of Example II with the exception that the zirconyl acetate comprised 10% by weight of the finished separator. Densities of these separators was in the range of 2.05–2.15 g/cm$^3$. Separators so made demonstrated dendrite resistance somewhat better than the calcium acetate-containing sheets and electrical resistivity of about 80 OHM·cm. The tensile strength of the separators made with Zr salts was considerably greater than with talc alone, or with talc and the Ca salts. Moreover, with the zirconyl acetate high levels of tensile strength can be maintained with as little as 15% by weight PTFE.

The embodiments of the invention in which an exclusive property or privilege is claimed are defined as follows:

1. A secondary zinc alkaline battery comprising a zinc electrode, a counterelectrode and a microporous separator between said electrodes for preventing zinc dendrite bridging between said electrodes, said separator having a first face adjacent said zinc electrode and a second face adjacent said counterelectrode and comprising a multiplicity of overlapping talc platelets randomly distributed throughout a fibrillated polytetrafluoroethylene binder, said platelets being oriented such that the face of the platelets substantially parallel the faces of the separator and being microspaced one from the other such as to define a tortuously-pathed network of interconnected pores extending between the faces of said separator.

2. A secondary zinc alkaline battery comprising a zinc electrode, a counterelectrode and a substantially planar microporous separator between said electrodes for preventing zinc dendrite bridging between said electrodes, said separator having a density of about 1.75 g/cm$^2$ to about 2.1 g/cm$^2$ and comprising at least 45% by weight overlapping talc platelets randomly distributed throughout a fibrillated polytetrafluoroethylene binder, said platelets substantially paralleling each other and the planes of the separator and varying in size from about 3 microns to about 10 microns mean diameter.

3. A secondary zinc alkaline battery comprising a zinc electrode, a counterelectrode and a microporous separator between said electrodes for preventing zinc dendrite bridging between said electrodes, said separator having a first face adjacent said zinc electrode and a second face adjacent said counterelectrode and comprising a multiplicity of overlapping talc platelets randomly distributed throughout a fibrillated polytetrafluoroethylene binder, said platelets being oriented such that the faces of the platelets substantially parallel the faces of the separator and being microspaced one from the other such as to define a tortuously-pathed network of interconnected pores extending between the faces of said separator and a salt selected from the group consisting of calcium acetate, calcium formate and zirconyl acetate.

4. A secondary zinc alkaline battery comprising a zinc electrode, a counterelectrode and a microporous separator between said electrodes for preventing zinc dendrite bridging between said electrodes, said separator having a first face adjacent said zinc electrode and a second face adjacent said counterelectrode and comprising at least 45% by weight overlapping talc platelets randomly distributed throughout a fibrillated polytetrafluoroethylene (PTFE) binder, said platelets being oriented such that the faces of the platelets substantially parallel the faces of the separator and being microspaced one from the other such as to define a tortuously-pathed network of interconnected pores extending between the faces of said separator; and a salt selected from the group consisting of calcium acetate, calcium formate and zirconyl acetate wherein the calcium salts when used comprise about 10% to about 35% of the talc-PTFE-salt mixture and the zirconium salt when used comprises about 5% to about 20% of the talc-PTFE-salt mixture.

5. A secondary zinc alkaline battery comprising a zinc electrode, a counterelectrode and a microporous separator between said electrodes for preventing zinc dendrite bridging between said electrodes, said separator having a first face adjacent said zinc electrode and a second face adjacent said counterelectrode and comprising at least about 75% by weight overlapping talc platelets randomly distributed throughout a fibrillated polytetrafluoroethylene binder, said platelets being oriented such that the faces of the platelets substantially parallel the faces of the separator and being microspaced one from the other such as to define a tortuously-pathed network of interconnected pores extending between the faces of said separator.

* * * * *